March 26, 1963  E. KELLER  3,082,815
FEEDING DEVICE FOR FALLING-FILM EVAPORATORS
Filed March 22, 1960  2 Sheets-Sheet 1

INVENTOR.
EMIL KELLER
BY
ATTORNEY

March 26, 1963 E. KELLER 3,082,815
FEEDING DEVICE FOR FALLING-FILM EVAPORATORS
Filed March 22, 1960 2 Sheets-Sheet 2

INVENTOR.
EMIL KELLER
BY
ATTORNEY

United States Patent Office 3,082,815
Patented Mar. 26, 1963

3,082,815
FEEDING DEVICE FOR FALLING-FILM
EVAPORATORS
Emil Keller, Zurich, Switzerland, assignor to Luwa A.G.,
Zurich, Switzerland, a Swiss company
Filed Mar. 22, 1960, Ser. No. 16,799
Claims priority, application Germany Mar. 24, 1959
11 Claims. (Cl. 159—6)

The present invention relates to an apparatus for concentrating liquids and, more particularly, to an evaporating apparatus wherein the liquid to be concentrated is distributed over the walls of an evaporation or concentrating chamber in the form of a film flowing freely downwardly under the influence of gravity.

In evaporators or concentrators of this type, it is conventional to use for the distribution of the liquid to be concentrated a rotor having radial blades extending into the vicinity of the interior wall surfaces of the evaporation chamber and distributing the liquid thereon in the form of a free falling film upon rotation of the rotor or impeller.

It is a primary object of the present invention to provide for an improved feeding and distribution of the liquid to be evaporated to the evaporation chamber.

A further object of the present invention is the provision of means permitting the supplying of the liquid to be evaporated to the evaporating chamber in a manner so as to avoid the formation of spray upon entry of the liquid into said chamber.

Still another object of the present invention is to provide improved means for feeding liquid to be evaporated to an evaporating apparatus operating under vacuum conditions, while permitting a more gradual expansion of the vapor formed upon entry of the liquid into the apparatus.

These and other objects of the present invention will become more apparent from the following description when taken in connection with the accompanying drawing, in which.

Figure 1:
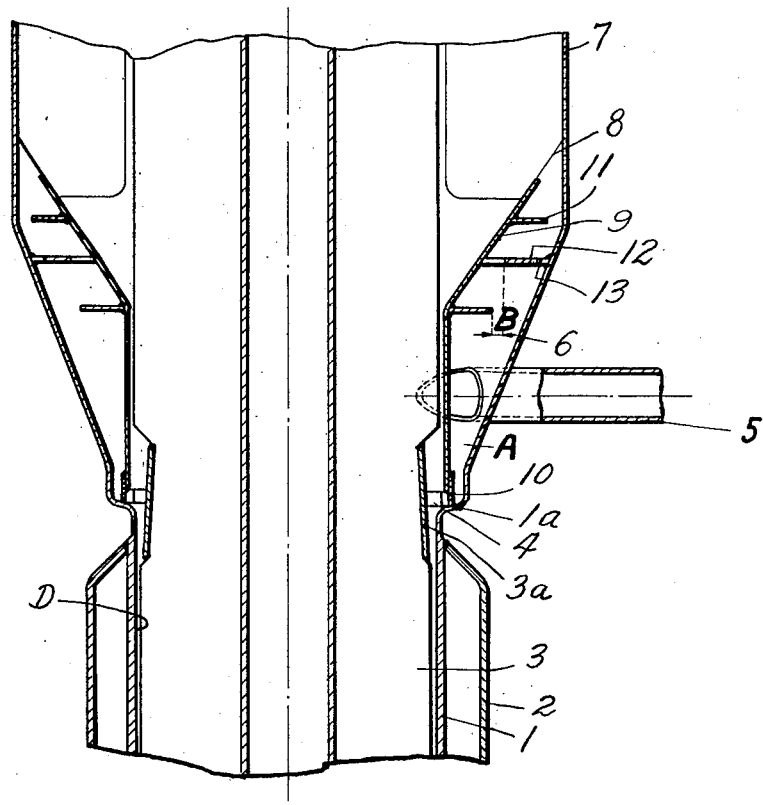
FIG. 1 is an axial section of an evaporator embodying the invention.

In the countercurrent falling-film evaporator according to FIG. 1, the reference numeral 1 designates a housing of substantially circular cross-section defining the cylindrical evaporator wall, the reference numeral 2 designates a heating jacket and the reference numeral 3 designates an agitator or rotor comprising several vanes. The wall of the housing 1 merges with an intermediate conical extension 6 which, in turn, ends in an upper cylindrical separator portion 7. A liquid supply line 5 communicates with said conical portion, preferably tangentially.

Inserted in the region of the conical portion 6 is a stationary yet adjustably positionable annular collar 9 which forms an annular space or compartment A together with the intermediate tapered wall of housing 1. The collar or sleeve 9 rests, by means of several legs 10 by means of which the height of the sleeve 9 may be adjustable, on a lateral shoulder 1a formed in the wall 1 in such a manner that annular slots or gaps 4 for the passage of the liquid from the annular compartment or space A into the inlet region of the evaporation chamber D are formed between the lower edge of the collar 9 and the housing wall. It is to be appreciated that the evaporation chamber D is defined by the region extending from approximately the annular gap 4 downwardly along the evaporator wall 1 and along the length of the blades of the rotor or agitator 3.

Baffle plates 11, 12 are alternatingly attached to the collar 9 and the housing wall respectively. The agitator or rotor 3 carries a deflector ring 3a on its circumference in the area of the annular gaps 4.

The liquid to be evaporated enters the annular space A serving as an expansion chamber through the inlet line 5 and it can there disperse over the entire circumference of the evaporator so as to flow evenly distributed to the housing wall 1 of the evaporator zone through the annular gap 4 formed between the collar 9 and the shoulder 1a of the housing 1. The deflector ring 3a attached to the agitator 3 retains any liquid spatters which may be formed during the passage of the liquid through the annular gap 4 and throws the collected liquid to the wall 1. Depending on its nature, the liquid entering the annular space A will foam and form spatters, particularly in vacuum operation or if heated. The baffle plates 11, 12 will return the upwardly directed spatters into the annular space A where they will again join the liquid. The foam formed, however, will slowly rise so as to overflow, evenly distributed at the top edge of the collar 9, and to be smashed by the vanes of the agitator 3 so that it will run down in liquid form along the collar 9 and also pass, evenly distributed, to the heated wall in the evaporation zone or area. The said destruction of the foam will be further facilitated by the radially arranged baffle plates 8, which are also stationary. In order to enable the liquid to return within the annular space A, the baffle plates 12 attached to the wall 6 are provided with circumferentially distributed passages 13.

After removal of the baffle-plate assembly, of which the baffle plates 8 form a part and which can be pulled out upwardly, the collar 9 and the baffle plates 11 arranged thereon can be withdrawn upwardly so that all members are easily accessible for cleaning. The baffle plates 11, 12 are accordingly so designed that a certain clearance space B is provided between their edges.

Figure 2:
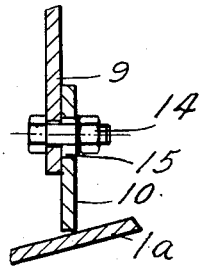
FIG. 2 is an enlarged section of a detail of the embodiment according to FIG. 1, and FIGS. 3 and 4 are an axial section and an elevation, respectively, of an evaporator according to a modified embodiment.

FIG. 2 shows a design of the upright brackets or support legs 10 which enables the height, or width of the annular slot or gap 4 to be adjusted. Provided in the leg 10 are slots for the attachment of clamping bolts 14 which enable the collar 9 to be raised or lowered.

The annular gaps 4 may be replaced by other means allowing the liquid to flow out, e.g. bores regularly distributed over the circumference, or a displaceable separate ring which may be provided with apertures.

Figure 3:
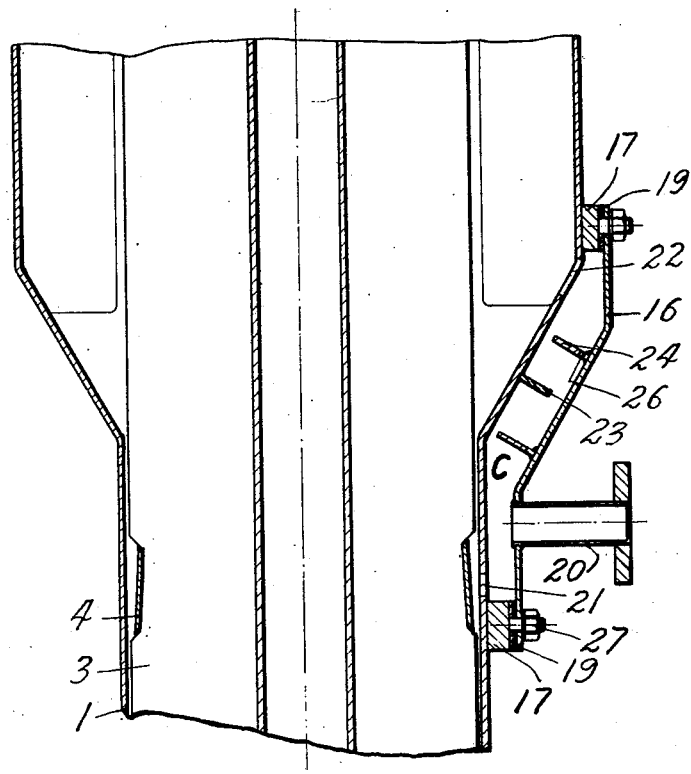
Figure 4:
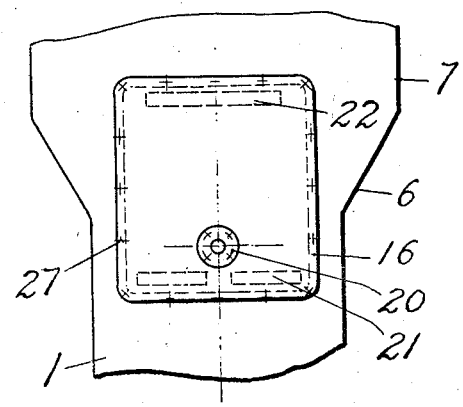

In existing evaporators the collar may, if necessary, be applied or mounted from the outside, but the supply of the liquid will then not be evenly distributed over the complete evaporator circumference. Such an embodiment is shown in FIGS. 3 and 4, FIG. 3 again showing a fragmentary axial section and FIG. 4 a fragmentary view taken in the direction of the liquid supply line.

The plate 16 serving as a collar is applied in such a manner that a space C is formed which extends over part of the circumference of the evaporator, the supply line 20 for the liquid to be evaporated opening into the said space. Welded to the outside of the evaporator wall along the entire circumference of the space C is a flange 17 provided with bolts 27 to which the plate 16 is bolted through the intermediary of a seal. The liquid enters the evaporating chamber through several openings 21 distributed along the circumference of the evaporator wall. Here, too, baffle plates 23, 24 are alternatingly attached to the collar or sleeve and the evaporator wall respectively, and passages 26 are provided in baffle plates 24 for the returning liquid. In the present case, the plate 16 can readily be removed for cleaning by unscrewing the nuts applied to the bolts 27. Foam and evaporated liquid emerge through openings 22 provided in the wall 1 at the upper end of the chamber C. It is to be understood that the evaporating and concentrating apparatus described herein is useful for processing fluid mediums in other ways, such as for distillation thereof, and this term is employed herein in its broader sense as other processing uses of the apparatus will be apparent to those skilled in the art.

Having thus described the invention, what is claimed as new and desired to be secured by Letters Patent is:

1. An apparatus for processing liquids comprising a housing having upper, intermediate and lower wall portions said upper and lower wall portions defining a separator zone, and an evaporator zone, respectively, said intermediate wall portion of the housing being directed upwardly and outwardly and defining a conical extension interconnecting said upper and lower wall portions, means for providing heat transfer through said lower wall portion defining the evaporator zone, rotor means mounted for rotation within said housing, a demountable stationary collar member spaced from said rotor means in the region of said conical extension and cooperating with the latter to define an expansion chamber therebetween communicating with said separator zone and said evaporator zone, and means for feeding a supply of liquid into said expansion chamber.

2. An apparatus for evaporating and concentrating liquids comprising a housing having upper, intermediate and lower wall portions, said upper and lower wall portions defining a separator zone and an evaporator zone, respectively, said intermediate wall portion being upwardly and outwardly directed and defining a stationary conical extension interconnecting said upper and lower wall portions, means for heating said lower wall portion defining said evaporator zone, rotor means mounted for rotation within said housing, a demountable stationary collar member spaced from said rotor means in the region of said stationary conical extension and cooperating with the latter to define an expansion chamber therebetween, means for feeding a supply of a liquid medium into said expansion chamber, and said expansion chamber having openings for directing liquid medium from said expansion chamber into said evaporator zone and for directing vapor into said separator zone.

3. An apparatus for evaporating and concentrating liquids according to claim 2; wherein said stationary collar member is in the form of a plate mounted externally of said housing.

4. An apparatus for evaporating and concentrating liquids according to claim 3; wherein said openings establishing communication between said expansion chamber and said evaporator and separator zones are located in said lower and intermediate wall portions, respectively.

5. An apparatus for evaporating and concentrating liquids according to claim 2; wherein said stationary collar member is an annular ring disposed intermediate said rotor means and said stationary conical extension to define said expansion chamber at the inside of the latter.

6. An apparatus for evaporating and concentrating liquids according to claim 5; further comprising adjustable support means adjacent the lower end of said stationary conical extension adjustably supporting said stationary collar member in spaced relation with respect to said housing to define slots of variable width therebetween constituting said openings which permit movement of the liquid medium from said expansion chamber into said evaporator zone.

7. An apparatus for evaporating and concentrating liquids according to claim 6; wherein said stationary collar member has its upper end in spaced relation to said upper wall portion of said housing to define an outlet opening permitting movement of vapor from said expansion chamber into said separator zone.

8. An apparatus for evaporating and concentrating liquids according to claim 7; further comprising baffle means in said expansion chamber defining a tortuous vapor pathway in the latter and operative to prevent liquid spatters from moving through said outlet opening into said separator zone.

9. An apparatus for evaporating and concentrating liquids comprising a housing having upper, intermediate and lower wall portions, said upper and lower wall portions defining a separator zone and an evaporator zone, respectively, said intermediate wall portion being upwardly and outwardly directed and defining a stationary conical extension interconnecting said upper and lower wall portions, means for heating said lower wall portion of said evaporator zone, rotor means mounted for rotation within said housing, a demountable annular ring disposed intermediate said rotor means and said stationary conical extension to define an expansion chamber therebetween, adjustable support means carrying said ring in spaced relation to the wall portions of said housing to define, adjacent one end of said ring, an adjustable slot through which a liquid medium can flow from said expansion chamber into said evaporator zone, and adjacent the opposite end of said ring, an outlet opening permitting flow therethrough of vapor from said expansion chamber into said separator zone, baffle means in said expansion chamber preventing liquid spatters from emerging through said outlet opening, and means for feeding a supply of liquid into said expansion chamber.

10. An apparatus for evaporating and concentrating liquids according to claim 9; wherein said rotor means has recessed portions opposite said adjustable slot; and further comprising deflecting means carried by said rotor means in said recessed portions for directing liquid spatters against a part of the inner surface of said wall portion defining said evaporator zone.

11. An apparatus for evaporating and concentrating liquids comprising a housing having upper, intermediate and lower wall portion, said upper and lower wall portions defining a separator zone and an evaporator zone, respectively, said intermediate wall portion being upwardly and outwardly directed and defining a conical extension interconnecting said upper and lower wall portions, means for heating said lower wall portion of said evaporator zone, rotor means mounted for rotation within said housing, a demountable stationary plate supported externally of said housing in the region of said conical extension to define an expansion chamber therebetween, said wall portions of said housing having upper and lower apertures in the region of said separator zone and said evaporator zone, respectively, said upper and lower apertures providing communication between said expansion chamber and said separator zone and evaporator zone, respectively, for movement of vapor and liquid, respectively, from said expansion chamber into said separator zone and evaporator zone, baffle means in said expansion chamber preventing entry of liquid spatters into said separator zone through said upper apertures, said rotor means having a recessed portion opposite said lower apertures, deflecting means carried by said rotor means in said recessed portion for directing liquid spatters against a part the inner surface of said wall portion defining the evaporator zone, and means for feeding a supply of liquid into said expansion chamber.

References Cited in the file of this patent

UNITED STATES PATENTS

| | | |
|---|---|---|
| 2,040,837 | Yarmett | May 19, 1936 |
| 2,596,086 | Muller | May 6, 1952 |
| 2,624,401 | Schilt | Jan. 6, 1953 |
| 2,807,321 | Schneider | Sept. 24, 1957 |

FOREIGN PATENTS

| | | |
|---|---|---|
| 599,269 | Great Britain | Mar. 9, 1948 |
| 1,019,642 | Germany | Nov. 21, 1957 |
| 1,061,293 | Germany | July 16, 1959 |